United States Patent
Walia et al.

(10) Patent No.: US 9,290,605 B2
(45) Date of Patent: Mar. 22, 2016

(54) METHOD FOR PREPARING FLEXIBLE POLYURETHANE FOAM WITH HYDROLYSABLE SILANE COMPOUNDS

(75) Inventors: Parvinder S. Walia, Midland, MI (US); Bernard E. Obi, Missouri City, TX (US); Venkat S. Minnikanti, Pearland, TX (US); William A. Koonce, Pearland, TX (US); Kamesh R. Vyakaranam, Pearland, TX (US); Ling Zhang, Missouri City, TX (US); Sabrina Fregni, Nonantola (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/236,615

(22) PCT Filed: Aug. 16, 2012

(86) PCT No.: PCT/US2012/051031
§ 371 (c)(1),
(2), (4) Date: Jan. 31, 2014

(87) PCT Pub. No.: WO2013/032718
PCT Pub. Date: Mar. 7, 2013

(65) Prior Publication Data
US 2014/0179815 A1    Jun. 26, 2014

Related U.S. Application Data

(60) Provisional application No. 61/529,342, filed on Aug. 31, 2011.

(51) Int. Cl.
| | |
|---|---|
| *C08G 18/28* | (2006.01) |
| *C08G 18/48* | (2006.01) |
| *C08G 18/10* | (2006.01) |
| *C08G 18/66* | (2006.01) |
| *C08G 18/76* | (2006.01) |
| *C08G 18/77* | (2006.01) |
| *C08G 18/16* | (2006.01) |
| *C08G 18/18* | (2006.01) |
| *C08G 18/20* | (2006.01) |
| *C08G 18/24* | (2006.01) |
| *C08G 18/32* | (2006.01) |
| *C08G 101/00* | (2006.01) |

(52) U.S. Cl.
CPC ............ *C08G 18/289* (2013.01); *C08G 18/10* (2013.01); *C08G 18/165* (2013.01); *C08G 18/1833* (2013.01); *C08G 18/1841* (2013.01); *C08G 18/2063* (2013.01); *C08G 18/246* (2013.01); *C08G 18/3275* (2013.01); *C08G 18/4816* (2013.01); *C08G 18/4841* (2013.01); *C08G 18/6688* (2013.01); *C08G 18/7664* (2013.01); *C08G 18/778* (2013.01); *C08G 2101/005* (2013.01); *C08G 2101/0008* (2013.01); *C08G 2101/0058* (2013.01); *C08G 2101/0083* (2013.01)

(58) Field of Classification Search
CPC ............. C08G 18/289; C08G 18/3893; C08G 18/5096
See application file for complete search history.

(56) References Cited

U.S. PATENT DOCUMENTS

| | | | | |
|---|---|---|---|---|
| 3,980,729 | A * | 9/1976 | Yokokawa et al. | 525/480 |
| 4,876,292 | A | 10/1989 | Milliren | |
| 5,990,185 | A * | 11/1999 | Fogg | 521/112 |
| 7,393,879 | B1 | 7/2008 | Krestia | |
| 7,674,840 | B2 | 3/2010 | Stanjek | |
| 2005/0043425 | A1 | 2/2005 | Beck | |
| 2005/0131088 | A1 | 6/2005 | Stanjek | |
| 2006/0084711 | A1 | 4/2006 | Stanjek | |
| 2009/0018228 | A1 * | 1/2009 | Mager et al. | 521/154 |
| 2009/0105358 | A1 | 4/2009 | Cremer | |
| 2010/0267854 | A1 | 10/2010 | Cremer | |
| 2010/0305229 | A1 | 12/2010 | Ziche | |
| 2012/0067520 | A1 * | 3/2012 | Schubert et al. | 156/329 |
| 2012/0225225 | A1 * | 9/2012 | Franken et al. | 428/34.1 |

FOREIGN PATENT DOCUMENTS

| | | | |
|---|---|---|---|
| EP | 162589 B | * | 2/1989 |
| JP | 59012947 A | * | 1/1984 |
| JP | 2011-037988 | | 2/2011 |
| WO | 2009/078724 | | 6/2009 |
| WO | WO 2010136280 A1 | * | 12/2010 |
| WO | WO 2011036018 A1 | * | 3/2011 |

OTHER PUBLICATIONS

Ulrich, H. Polyurethanes. Encyclopedia of Polymer Science and Technology. John Wiley & Sons. Published Online Oct. 22, 2001. pp. 26-72.*
Written Translation of JP59-012947A. Jan. 23, 1984.*
GE Advanced Materials, Niax* Processing Additive DP-1022, Mar. 2005.

* cited by examiner

*Primary Examiner* — Robert C Boyle
*Assistant Examiner* — Stephen Rieth
(74) *Attorney, Agent, or Firm* — Gary C Cohn PLLC

(57) ABSTRACT

Flexible polyurethane foams are made using certain hydrolysable silane compounds in the foam formulation. The hydrolysable silane compounds contain at least one isocyanate-reactive group and at least one hydrolysable silane group. The presence of the hydrolysable silane compound in the foam formulation leads to improved tensile, tear and elongation properties without an adverse effect on other important foam properties such as resiliency and hysteresis loss.

11 Claims, No Drawings

METHOD FOR PREPARING FLEXIBLE POLYURETHANE FOAM WITH HYDROLYSABLE SILANE COMPOUNDS

This application claims priority from U.S. Provisional Patent Application No. 61/529,342, filed 31 Aug. 2011.

This invention relates to flexible polyurethane foams and methods for preparing those foams.

Flexible polyurethane foams are often used as cushioning in seating and bedding applications. These foams are made by curing a mixture of a polyisocyanate, high equivalent weight polyol and a blowing agent. The blowing agent is typically water by itself or a mixture of water with one or more other blowing agents. These foams can be made by mixing the precursor materials so that they react and rise freely under minimal constraint. This type process is commonly known as a slabstock process. The slabstock process is used to make large foam masses ("buns") that are subsequently cut into shapes and dimensions needed for their particular uses. The other main way of making these foams is a molding process, in which the precursors are cured in a closed mold that constrains the expansion of the foam and also sets the shape and dimensions of the molded part. This method is often used when the foam part needs to have a complex geometry, or when a compact skin is wanted on the surface of the foam. Molding methods are often used to make cushioning foams used in vehicle interiors, such as automotive headrests and seating cushions.

Among the important foam properties that are needed for most cushioning applications are densities below 80 kg/m$^3$ (to minimize weight and costs), load-bearing (particularly in the case of resilient foams), compression set (the permanent deformation of the foam due to an applied load), and so-called "TTE" properties—tensile strength, tear strength and elongation. TTE properties are important because the foam needs to have the mechanical integrity to withstand the normal handling that the foam experiences during demolding and/or fabrication processes and end use.

Counter-measures that lead to better TTE properties often lead to poorer performance in other areas. It is known, for instance, that TTE properties can be improved by including chain extenders and/or crosslinkers in the foam formulation (or by increasing the amounts of those materials). See, e.g., U.S. Pat. No. 4,876,292 and GE Advanced Materials product literature for Niax™ DP-1022 Processing Additive. This approach can lead to the undesirable effect of increased compression set. It also has the disadvantage of increasing the amount of the expensive polyisocyanate component that is needed to adequately cure the foam.

Low hysteresis loss is a wanted attribute of foams for many seating and bedding applications. Hysteresis loss is a measure of the amount of energy that is lost when a foam is compressed, such as when the weight of a person is applied to the foam. When a flexible foam is compressed, some portion of the energy used to compress the foam is dissipated and therefore lost. The remainder of the energy is returned when the compressive force is removed. The proportion of the compressive energy that is dissipated is the hysteresis loss. In seating and bedding applications, the returned energy supports the occupant and this support is generally perceived as contributing to the comfort of the seating. Low hysteresis loss also correlates to lower vibrational transmissivity through the foam. The ability of the foam to absorb vibration is another significant contributor to perceived comfort, especially in vehicular applications.

Unfortunately, measures that contribute to low hysteresis loss often lead to foams that have inadequate TTE properties.

Certain industry trends have increased the difficulty of producing low hysteresis foams with good properties. In the automotive industry, there is a continuing desire to reduce vehicle weight and to make vehicles smaller while at the same time preserving cabin space. These trends are leading manufacturers to reduce the thickness of the seating foams. The thickness reduction both reduces the weight of the foam and its volume, but increases demands on the foam because the necessary performance must be provided by a smaller mass of polymer.

Another industry trend is the move towards low emissive amine catalysts. Conventional amine catalysts volatilize during the foaming reaction, escaping into the atmosphere where they cause odor and present worker exposure issues. The low emissive catalysts have isocyanate-reactive groups, so they become incorporated into the polymer network rather than volatilizing. However, compression sets and especially humid aged compression sets can become unacceptably high when these low emissive amine catalysts are used.

Various types of silicones have been used as ingredients of flexible polyurethane foam formulations. Silicone surfactants are of course ubiquitous, being widely used as cell stabilizing agents. Hydroxy-terminated polysiloxanes have been used in polyurethane foam formulations to provide flame resistance and to improve the temperature stability of the foam. Examples of this approach are described in U.S. Pat. No. 7,393,879, DE4108326, EP1485419 (US 2005-0131088), EP 2217640 (US 2010-0267854) and WO 2007107435 (US 2009-0105358). Significant amounts of these polysiloxanes are needed to achieve the desired effects on flammability and temperature stability. In addition, alkoxy silicones have been used to make flexible foams in isocyanate-free formulations. Systems of this type are described in DE 19831285 (AU 157799), EP1625175 (US 2006-0084711), EP 2183300 (US 2010-0305229) and WO 2009007038 (US 2009-0018228). These systems often are not easily adaptable to conventional polyurethane foam processing methods due in part to their high viscosities. In addition, the typical mechanism of producing carbon dioxide blowing gas through the water-isocyanate reaction is not available with these systems, because these systems lack isocyanate groups. Therefore, they depend on physical blowing agents.

A method for producing low hysteresis foam having other acceptable properties, notably compression set and tensile strength, tear strength and elongation is desired.

This invention is a flexible polyurethane foam comprising a reaction product of ingredients that include a) one or more isocyanate-reactive compounds that contain an average of at least 2 isocyanate-reactive groups per molecule, contain no hydrolysable silane groups and have an equivalent weight per isocyanate-reactive group of at least 200;

b) from 1 to 100 parts by weight, per 100 parts by weight of component a), of one or more hydrolysable silane compounds that contain at least two hydrolysable silane groups per molecule, or at least one hydrolysable silane group per molecule and at least one isocyanate-reactive hydroxyl, primary or secondary amino group per molecule;

c) a blowing agent that includes water; and d) at least one organic polyisocyanate compound, wherein 1) some or all of component a), component b) or both can be pre-reacted with the organic polyisocyanate compound(s) to form an isocyanate terminated prepolymer or quasi-prepolymer; and 2) the organic polyisocyanate compound is present in an amount sufficient to provide an isocyanate index of from 70 to 150.

The presence of the hydrolysable silane compound surprisingly has been found to provide increases in at least one of the TTE properties (and without loss of the other TTE properties). In most cases, an increase in tensile strength, tear strength or both is seen, and in some cases an increase in all three of tensile strength, tear strength and elongation is seen. These comparisons are relative to a like foam made at equivalent density and equivalent isocyanate index from the same starting materials except for the absence of the hydrolysable silane compound. In high resiliency, low hysteresis foams, these increases in TTE properties are often obtained with no significant increase in hysteresis loss.

Another advantage of the invention is that the foam properties are generally good even after humid aging. Deterioration in TTE properties upon humid aging is generally reduced when a hydrolysable silane compound is present in the foam formulation, particularly when low emissive amine catalysts are used to produce the foam. Thus some or all of the compromise in properties after humid aging that is seen when low emissive reactive amine catalysts are used to produce the foam are overcome with this invention.

Yet another advantage is that the hydrolysable silane compound in many cases is much lower in viscosity than is the component a) material. Therefore, previously-formed blends of components a) and b) often have viscosities that are significantly lower than that of component a) by itself. Similarly, formulated isocyanate-reactive mixtures that contain components a) and b), as well as auxiliaries such as water and/or other blowing agent, catalyst and surfactant, also exhibit lower viscosities, compared to when component b) is absent. This lower viscosity carries over to the reaction mixture that is formed when the polyisocyanate is added; lower viscosities are seen during the early stages of cure, which promotes good flow of the material as it expands. This reduces defects and permits large and complex shaped molds to fill more easily. The lower viscosity can lead to lower operating pressures and easier mixing with the polyisocyanate compound during foam processing. The ability to obtain reduced formulation viscosities without a significant loss in foam properties is an important and unexpected advantage of the invention. Although diluents have been used before to reduce formulation viscosities, these diluents often have an adverse effect on foam properties and may slow the cure.

Yet another advantage is that, like conventional polyurethane foam formulations, and unlike the alkoxy silicone-based isocyanate-free formulations, it is unnecessary to use physical blowing agents in the formulation (although they may be used if desired). Foam is easily made in accordance with the invention using water as a blowing agent, or even as the sole blowing agent.

Component a) is one or more isocyanate-reactive compound(s) that contains an average of at least 2 isocyanate-reactive groups per molecule, contains no hydrolysable silane groups and has an equivalent weight per isocyanate-reactive group of at least 200. The isocyanate-reactive compound(s) within component a) may contain an average of 2 to 8, preferably an average of 2 to 4 and more preferably an average of 2 to 3 isocyanate-reactive groups per molecule. The isocyanate-reactive groups may be, for example, primary hydroxyl groups, secondary hydroxyl groups, primary amino groups, secondary amino groups, or some mixture of two or more of such groups.

For making high resiliency, low hysteresis loss foams, the isocyanate-reactive groups preferably are primary hydroxyl groups, secondary hydroxyl groups or a mixture of primary and secondary hydroxyl groups. The equivalent weight may be at least 500, at least 700, at least 1000 or at least 1200, and may be as high as about 3000, as high as about 2500, as high as 2200 or as high as 2000.

For making low resiliency viscoelastic foams, the equivalent weight may be at least 225 up to about 500, preferably up to about 400 and more preferably up to about 350.

Among the useful component a) materials are polyether polyols, polyester polyols, hydroxy-functional acrylate polymers and copolymers such as polymers and copolymers of hydroxyethylmethacrylate or hydroxyethylacrylate, hydroxy-terminated polybutadienes, polysiloxanes that are terminated with hydroxyl groups (such as silanol or hydroxyalkyl groups), and the like. Polyether polyols are generally preferred on the basis of excellent performance, wide availability and low cost. Preferred polyether polyols are polymers of propylene oxide and random and block copolymers of propylene oxide and ethylene oxide. A copolymer of propylene oxide and ethylene oxide may contain up to about 20% by weight oxyethylene units.

One or more of the component a) isocyanate-reactive compounds may contain a disperse polymer phase. The disperse polymer phase may be particles of one or more ethylenically unsaturated monomer(s) (of which styrene, acrylonitrile and styrene-acrylonitrile copolymers are of particular interest), polyurea particles, or polyurethane particles. The disperse phase may constitute from 5 to 60% by weight of the total weight of the component a) compounds.

Component b) is a hydrolysable silane compound (or mixture of two or more thereof). The hydrolysable silane compound preferably has a molecular weight of at least 250, more preferably at least 500. Its molecular weight may by as much as 6000 or more, but preferably is no greater than 3000 or no greater than 2000. Hydrolysable silanes that have molecular weights from 250 to 3000, especially 500 to 2000, tend to have favorable viscosities. The hydrolysable silane compound may have a boiling temperature of at least 100° C. and more preferably at least 160° C. (at one atmosphere pressure).

The component b) compound contains at least one hydrolysable silane group per molecule if the compound also has one or more hydroxyl, primary amino and/or secondary amino groups. If the hydrolysable silane compound does not contain any hydroxyl, primary amino and secondary amino groups, it will contain at least two hydrolysable silane groups. The compound may contain two or more hydrolysable silane groups per molecule even if it contains a hydroxyl, primary amino or secondary amino group (or more than one of such groups).

For purposes of this invention, a hydrolysable silane group takes the form —Si—(O—R)$_x$, where x is from 1 to 3, preferably 2 or 3 and R is hydrocarbyl or substituted hydrocarbyl. R may be, for example, lower alkyl (such as methyl, ethyl, n-propyl, isopropyl, n-butyl, sec-butyl, t-butyl and the like), a cycloalkyl group or alkyl-substituted cycloalkyl group such as cyclohexyl, aryl-substituted alkyl such as benzyl, or phenyl or alkyl-substituted phenyl. The valencies of the Si atom that are not bonded to an O—R group are bonded to non hydrolysable groups such as hydrogen, a hydrocarbyl or substituted hydrocarbyl group, a polyether chain, a siloxane or polysiloxane group, and the like.

The hydrolysable silane compound preferably contains at least one isocyanate-reactive hydroxyl, primary or secondary amino group. It may contain two or much such groups, to as many as eight or more. Preferred hydrolysable silane compounds contain up to three hydroxyl, primary or secondary amino groups, and more preferred hydrolysable silane compounds contain one or two, especially only one of such groups.

The isocyanate-reactive groups of the hydrolysable silane compound may be bonded directly to silicon atoms (such as, for example, silanol groups) or, preferably, to carbon atoms (such as hydroxyalkyl and aminoalkyl groups).

Some suitable hydrolysable silane compounds that also contain isocyanate-reactive groups can be represented by structure I

$$Z_y\text{-}A\text{-}[Si(OR)_x]_q \quad (I)$$

wherein each Z is independently a hydroxyl, primary amino or secondary amino group, y is a number from 1 to 8, preferably from 1 to 3, more preferably 1 to 2 and still more preferably 1, A is a linking group, q is at least one and R and x are as defined before. In structure I, R is preferably lower alkyl as described before and x is preferably 2 or 3. q is preferably 1, 2 or 3 and more preferably 1. A preferably is selected so that the hydrolysable silane compound is soluble in the component a) compound(s) at the relative proportions present in the reaction mixture. A may be, for example, a linear or branched polysiloxane chain, a linear or branched polyether chain, a linear or branched polyester chain, a hydrocarbyl group that may be aliphatic, cycloaliphatic and/or aromatic and/or may be inertly substituted, and the like.

An especially preferred class of hydrolysable silane compounds includes polyether monols or polyols (most preferably monols) that are substituted with at least one (most preferably exactly one) hydrolysable silane group. The polyether chain in such preferred hydrolysable silane compounds is preferably a polymer of propylene oxide, ethylene oxide or a mixture of propylene oxide and ethylene oxide, having a weight of from 250 to 3000, preferably from 500 to 2000. Hydrolysable silane compounds of this type can be prepared by polymerizing one or more alkylene oxides onto an initiator that contains at least one alkene group and one or more oxyalkylatable groups such as hydroxyl, primary amino or secondary amino groups. This produces an unsaturated polyether. The alkene group(s) are then reacted with a silane of the form

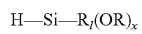

$$H\text{—}Si\text{—}R_l(OR)_x$$

where R and x are as defined before, and l is 0, 1 or 2, such that l+x equals 3.

Component b) is present in an amount from 1 to 100, preferably from 5 to 50, more preferably from 5 to 25, and more preferably from 5 to 20 parts by weight per 100 parts by weight of component a).

Component c) is an organic polyisocyanate having an average of 1.8 or more isocyanate groups per molecule. The isocyanate functionality is preferably from about 1.9 to 4, and more preferably from 1.9 to 3.5 and especially from 1.9 to 2.5. Suitable polyisocyanates include aromatic, aliphatic and cycloaliphatic polyisocyanates. Aromatic polyisocyanates are generally preferred based on cost, availability and properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4''-triphenylmethane tri-isocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI, as well as mixtures of the 2,4- and 2,6-isomers of TDI.

The organic isocyanate is present in an amount to provide an isocyanate index of 70 to 150. Isocyanate index is 100 times the ratio of isocyanate groups to isocyanate-reactive groups in the reaction mixture. A preferred isocyanate index is from 80 to 125, a more preferred isocyanate index is from 85 to 115, and a still more preferred isocyanate index is from 90 to 110. An advantage of the invention is that excellent TTE properties are often obtained even at somewhat low isocyanate indices (such as from 85 to 100 or from 90 to 100).

The foam formulation includes water. Water is believed to perform at least two roles in the foam-forming process. A portion of the water reacts with isocyanate groups in the normal way to produce urea linkages and generate carbon dioxide that functions as a blowing gas. In addition, a portion of the water may react with the hydrolysable silane groups, producing a silanol that can react with another hydrolysable silane group to form a siloxane linkage. Some or all of the hydrolysable silane groups may alternatively or in addition react with atmospheric water or other ambient moisture in a similar manner, after the initial cure of the foam has been completed.

Water is provided in the reaction mixture to react with more of the isocyanate groups and generate carbon dioxide blowing gas. When water is the sole blowing agent, the total amount of water may range from about 1.5 to about 7 parts by weight per 100 parts by weight of component a). A more preferred amount is about 1.5 to about 5 parts, an even more preferred amount is about 2 to about 3.5 parts, and a still more preferred amount is from 2 to 3 parts by weight water per 100 parts by weight component a).

In most cases it is preferred to include additional water in the reaction mixture, in addition to that amount needed to blow the foam to the desired density, to engage in crosslinking reactions with the hydrolysable silane groups. In general, it is preferred to provide more than one-half mole of water per mole of hydrolysable silane groups provided by component b), in addition to that needed to blow the foam to the desired density. Typically, from about 0.02 to 0.5 additional parts by weight water per 100 parts by weight of component a), is sufficient. Amounts of water in excess of this range may tend to produce foams that have higher hysteresis losses.

In alternative embodiments, no additional water is present in the foam formulation. In such cases, the hydrolysable silane groups can react with ambient moisture to form secondary crosslinks. The cured foam also can be wetted to promote secondary crosslinking.

Auxiliary blowing agents may be present, in addition to the water. If such an auxiliary blowing agent is present, somewhat smaller amounts of water may be used than are described above. Examples of auxiliary blowing agents include chemical (exothermic) types such as various carbamate and azo compounds, as well as physical (endothermic) types such as various low-boiling hydrocarbons, fluorocarbons, hydrofluorocarbons, hydroflurochlorocarbons, and the like.

It is generally desirable to provide enough blowing agent (whether water alone or water plus one or more auxiliary blowing agents) to produce a foam density from 20 to 100 $kg/m^3$, preferably from 28 to 80 $kg/m^3$.

The reaction mixture preferably contains at least one catalyst for the reaction of water and/or alcohol groups with an isocyanate group (i.e., a "urethane catalyst"). One preferred type of urethane catalyst is a tertiary amine catalyst. Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N, N, N'-trimethyl-N'-hydroxyethyl bis(aminoethyl)ether, N,N-bis(3-dimethylaminopropyl)N-isopropanolamine, (N,N-dimethyl)aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

The tertiary amine catalyst may be a low emissive catalyst that contains, in addition to at least one tertiary amino group, at least one isocyanate-reactive group such as a hydroxyl group or a primary or secondary amino group.

The foam formulation may contain one or more other urethane catalysts for the reaction of water or alcohols with an isocyanate group, instead of or in addition to the tertiary amine catalyst mentioned before. Suitable such other urethane catalysts include, for example:

tertiary phosphines such as trialkylphosphines and dialkylbenzylphosphines;

chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni;

acidic metal salts of strong acids, such as ferric chloride, stannic chloride, stannous chloride, antimony trichloride, bismuth nitrate and bismuth chloride;

strong bases, such as alkali and alkaline earth metal hydroxides, alkoxides and phenoxides;

alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;

alkaline earth metal, Bi, Pb, Sn or Al carboxylate salts; and tetravalent tin compounds, and tri- or pentavalent bismuth, antimony or arsenic compounds.

Of particular interest are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Urethane catalysts are typically used in small amounts. For example, the total amount of catalyst used may be 0.0015 to 5, preferably from 0.01 to 1 part by weight per 100 parts by weight of polyol or polyol mixture. Metallic catalysts are typically used in amounts towards the low end of these ranges.

The reaction mixture may also contain one or more catalysts for the reaction of hydrolysable silane groups towards water and/or silanol groups ("silane crosslinking catalysts"). Examples of such catalysts include Bronsted acids, especially those having a pKa of 1 or lower; various Lewis acids, various metal chelates such as dialkyltinacetylactonates, various tertiary amine catalysts, acid-blocked tertiary amines, thiols and the like. It is noted that certain materials are effective catalysts for the water or alcohol/isocyanate reaction and for the hydrolysable silane/water or silanol reactions. In such cases, it is possible to use a single catalyst to perform both functions.

Specific examples of catalysts for reaction of hydrolysable silane groups towards water and/or silanol groups include dibutyl tin acetylacetonate, dodecyl benzene sulfonic acid and the like.

Catalysts for the reaction of hydrolysable silane groups towards water and/or silanols can be used in small amounts, such as from 0.001 to 0.25 parts per 100 parts of component a). In some cases, especially when the silane crosslinking catalyst is or includes a Bronsted acid, the silane crosslinking catalyst may partially deactivate a tertiary amine urethane catalyst if used in too large quantities. Therefore, large amounts of Bronsted acid catalysts are generally to be avoided, and it may be desirable to adjust the level of tertiary amine urethane catalyst in cases where a Bronsted acid silane crosslinking catalyst is present.

The reaction mixture may contain one or more crosslinkers, by which it is meant compounds that contain greater than two isocyanate-reactive groups/molecule and have an equivalent weight per isocyanate group of up to 125 (such as from 30 to 125 or from 30 to 75). The isocyanate-reactive groups are preferably aliphatic alcohol, primary amine or secondary amine groups, with aliphatic alcohol groups being particularly preferred. Crosslinkers are typically used in small quantities, such as up to 10 parts, especially up to 2 parts, more preferably from 0.25 to 1 part by weight per 100 parts by weight of component a), when present at all. Examples of crosslinkers include glycerine; trimethylolpropane; triethanolamine; diethanolamine and the like. Triethanolamine and diethanolamine are especially preferred crosslinkers.

The reaction mixture may contain one or more chain extenders. A chain extender is a material having exactly two isocyanate-reactive groups/molecule, and an equivalent weight per isocyanate-reactive group from about 30 to about 125, preferably from 30 to 75. Suitable chain extenders include alkylene glycols such as ethylene glycol, 1,2- or 1,3-propylene glycol, 1,4-butanediol, 1,6-hexanediol, and the like; glycol ethers such as diethylene glycol, triethylene glycol, dipropylene glycol, tripropylene glycol and the like; and cyclohexane dimethanol. Chain extenders may be omitted from the reaction mixture. If present, they are in some embodiments present in small amounts such as up to 3 parts or up to 2 parts by weight per 100 parts by weight of component a). For example, chain extenders may be present in an amount from 0.1 to 5, preferably from 0.25 to 3 parts, still more preferably from 0.25 to 2 parts by weight per 100 parts by weight component a).

A reaction mixture preferably includes at least one surfactant to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8462 and B-8404, DC-198 and DC-5043 surfactants, available from Dow Corning, and Niax™ 627 surfactant from OSi Specialties. Non-hydrolyzable liquid organosilicones are more preferred, and low VOC surfactants are preferred. The surfactant is typically present in an amount of 0.0015 to 1 part by weight per 100 parts by weight polyol or polyol mixture.

Flexible foam formulations may contain a cell opener. Suitable cell openers include polyether polyols having from 3 to 8 hydroxyl groups per molecule, a hydroxyl equivalent weight from 1000 to 12,000. Among the suitable cell openers are polymer or copolymers of ethylene oxide that have an oxyethylene content of 30% or more, more typically from 50 to 100%. Another useful class of cell openers includes polymers and copolymers of butylene oxide as described in U.S. Pat. No. 4,596,665.

Various additional components may be included in the reaction mixture. These include, for example, surfactants, plasticizers, fillers, colorants, preservatives, odor masks, flame retardants, biocides, antioxidants, UV stabilizers, antistatic agents, thixotropic agents and cell openers.

Foam is prepared by combining the ingredients of the reaction mixture and curing them. The curing can be performed in a one-step reaction by mixing components a), b), c) and d) (as well as any crosslinkers and/or chain extenders as may be used) and allowing them to react all at once. Alternatively, all or a portion of components a) or b) or both may be pre-reacted with the polyisocyanate (component d)), in the absence of water if component b) is present, to form an isocyanate-terminated prepolymer or quasi-prepolymer. This prepolymer or quasi-prepolymer is then further cured by reaction with water or a mixture of water with (1) any remaining portion of components a) and/or b), (2) a crosslinker and/or chain extender, or a combination of (1) and (2) to produce the foam.

In some embodiments, the prepolymer or quasi-prepolymer is formed by prereacting all or a portion of component b) with the polyisocyanate (component d)), and the prepolymer or quasi-prepolymer is then further cured by reaction with a mixture of water and component a) or a mixture of water and component a) and (1) any remaining portion of b), (2) a crosslinker and/or chain extender, or both (1) and (2) to produce the foam. For example, from 10 to 25 parts of component b) may be pre-reacted with 100 parts by weight of the organic polyisocyanate compound(s) to form the isocyanate-terminated prepolymer or quasi-prepolymer.

It is also possible to pre-react the polyisocyanate (component d)) with a chain extender and/or crosslinker to form a prepolymer or quasi-prepolymer that is then reacted with components a) and b) in the presence of component c).

An advantage of the invention is that the curing step can usually be performed using equipment and methods that are suitable for producing conventional polyurethane foams.

The foam-forming reaction can be performed in a so-called slabstock process, or by various molding processes. In a slabstock process, the components are mixed and poured into a trough or other region where the formulation reacts, expands freely or under minimal constraint (such as may be applied due to the weight of a cover sheet or film) in at least one direction, and cures. Slabstock processes are generally operated continuously at commercial scales.

In a slabstock process, the various components of the reaction mixture are introduced individually or in various subcombinations into a mixing head, where they are mixed and dispensed. Component temperatures are generally in the range of from 15 to 35° C. prior to mixing, but may be higher or lower. The dispensed mixture typically expands and cures without applied heat.

In a slabstock process, component b) can be mixed into the reaction mixture in several ways. It can be delivered into the mixing head as a separate stream, or may be pre-blended with one or more other components, such as component a), a surfactant stream or a catalyst stream to produce a formulated polyol component. All or part of component b) may be formed into a prepolymer or quasi-prepolymer, and introduced into the reaction mixture in that manner.

It is also possible to produce the foam in a molding process, by introducing the reaction mixture into a closed mold where it expands and cures. In a molding process, it is typical to mix component b) with component a), the blowing agent(s) and other components (except the polyisocyanate) to form a formulated polyol stream which is mixed with the polyisocyanate immediately before filling the mold. It is also possible to bring the ingredients of the reaction mixture to a mixhead individually or in various other subcombinations, where they are mixed and dispensed into the mold. Component temperatures in a molding process may be from, for example, 10 to 60° C. at the time they are brought together to form the reaction mixture. The mold may be heated to drive the cure. For example, the mold may be preheated to a temperature of, for example, 40 to 100° C., preferably from 50 to 80° C., prior to the introduction of the reaction mixture. Alternatively or in addition, the filled mold may be heated to drive the cure, again preferably at a temperature of from 40 to 100° C. and more preferably from 50 to 80° C. The reaction mixture is cured in the mold until it has expanded to fill the mold, and until the resulting foam has developed enough physical strength to allow it to be demolded without permanent distortion or damage.

Although the invention is not limited to any theory, it is believed that the hydrolysable silane compound provides a secondary crosslinking mechanism that leads to an enhancement of one or more of the TTE properties. In high resiliency foams, this advantage is often seen without significant adverse affect on hysteresis loss. This secondary crosslinking reaction may proceed more slowly than the reaction of the water and polyol(s) with the polyisocyanate. In the preferred embodiments, in which the hydrolysable silane compound contains one or more isocyanate-reactive groups, the isocyanate-reactive groups of the hydrolysable silane compound are believed to react with isocyanate group(s) before the hydrolysable silane groups react with water and become crosslinked. This allows the hydrolysable silane compound(s) to become bound into the polymer structure of the foam during the main cure, while introducing hydrolysable silane groups that can crosslink into the polymer structure later. It is believed that a significant number of the hydrolysable silane groups participate in these crosslinking reactions during the initial cure of the foam; however, some of the hydrolysable silane groups may remain free to react at some subsequent time, such as during postcuring, for example, or with atmospheric water under humid conditions. Some secondary crosslinking may occur even under ambient conditions. The ability to engage in crosslinking reactions may account for the excellent humid age compression sets that are seen with this invention.

Polyurethane foam made in accordance with the invention may have a density from 20 to 100 kg/m$^3$, preferably from 28 to 80 kg/m$^3$. Foam densities are generally selected within these broader ranges to reflect the demands of specific end-use applications. For example, foam for bedding and furniture applications tends to have a density toward the lower end of these ranges, such as from 20 or from 28 kg/m$^3$ up to 54 kg/m$^3$ or up to 48 kg/m$^3$. Foam for automotive seating often has a density from 40 kg/m$^3$ up to 100 kg/m$^3$ or up to 80 kg/m$^3$. Foam density is conveniently measured in accordance with ASTM D3574 Test A.

Tear strength of the foam is conveniently measured according to DIN 53356. Tensile strength and elongation are measured according to ISO 1798. Typically, at least one of these values is increased with this invention with no or negligible loss in the others, relative to a like foam made at equivalent density and equivalent isocyanate index from the same starting materials except for the absence of the hydrolysable silane compound. Often, foam produced in accordance with the invention exhibits an increase in tensile strength, tear strength or both tensile strength and tear strength, with no more than negligible loss in elongation (if any at all). Foams of the invention sometimes exhibit an increase in all three of tensile strength, tear strength and elongation.

The invention is especially useful for producing polyurethane foam characterized in having high resiliency and low hysteresis loss. High resiliency is indicated by a ball rebound of at least 60%, preferably at least 75%, on a ball rebound test such as ASTM D3574 Test H. Low hysteresis loss is indicated by an energy loss of no more than 25%, preferably no more than 19% and more preferably no more than 15% on a mechanical compressive stress-strain analysis such as ASTM D3574 Test C. The hysteresis loss is determined by repeatedly compressing the foam to 60% of its original thickness, followed by release of the compressive force. Measurements are made in the fifth cycle. The energy required to compress the foam through the range from 100% to 60% of the original foam thickness is measured as the foam is compressed (the compressive energy), and measured again as the compressive force is released (the return energy). Hysteresis loss is 100% times (compressive energy—return energy)/compressive energy.

High resilience, low hysteresis loss foam of the invention also tends to exhibit low compression sets. Compression set at 50% compression can be measured in accordance with ISO 1856. Foam of the invention often exhibits a compression set of 10% or less when measured according to this test. Foam of the invention often performs especially well on humid aging compression set testing such as, for example, after conditioning the foam samples at 90° CC, 100% relative humidity for 200 hrs. Surprisingly, the invention provides foam having excellent humid age compression set, even when the foam is made using one or more low emissive amine catalysts that contain isocyanate-reactive groups and therefore reacted into and become part of the polymer structure. The invention therefore provides a way in which to at least partially overcome the problem of poor humid age compression set (and other loss of properties upon humid aging) that is sometimes associated with the use of these low emissive catalysts.

Foam made in accordance with the invention is useful in a variety of packaging and cushioning applications, such as mattresses and other bedding, home and office seating such as upholstered chairs, chaises, divans, sofas sectional sofas and the like; vehicular seating such as for automobiles, trucks, trains, passenger ships and aerospace vehicles; flotation devices; various types of padding and cushioning for packaging, and the like.

The following examples are provided to illustrate the invention, but are not intended to limit the scope thereof. All parts and percentages are by weight unless otherwise indicated.

EXAMPLES 1-4 AND COMPARATIVE SAMPLES A AND B

Polyurethane foams are made from the ingredients listed in Table 1 below. In each case, all ingredients except the polyisocyanate are mixed together with a high-speed laboratory mixer for about one minute. The viscosity at 25° C. of this formulated isocyanate-reactive mixture is measured in the cases of Comparative Sample A and Example 2. The polyisocyanate is then mixed in for about 5 seconds, and the reaction mixture is then poured into a 54° C. mold where it is cured for 6 minutes and then demolded.

TABLE 1

| | Parts By Weight | | | | | |
|---|---|---|---|---|---|---|
| Ingredient | Comp. Samp. A | Comp. Samp. B | Ex. 1 | Ex. 2 | Ex. 3 | Ex. 4 |
| Polyol A[1] | 97 | 87 | 87 | 87 | 87 | 87 |
| Cell opener[2] | 3 | 3 | 3 | 3 | 3 | 3 |
| Hydrolysable Compound A[3] | 0 | 0 | 10 | 10 | 10 | 10 |
| Polyether monol[4] | 0 | 10 | 0 | 0 | 0 | 0 |
| Diethanol amine | 0.5 | 0.5 | 0.5 | 0.5 | 0.5 | 0.5 |
| Water | 2.5 | 2.7 | 2.7 | 2.7 | 2.7 | 2.7 |
| Silicone surfactant[5] | 0.45 | 0.45 | 0.45 | 0.45 | 0.45 | 0.45 |
| Low emissive amine catalyst A[6] | 0.75 | 0.75 | 0.75 | 0.75 | 0.75 | 0.75 |
| Low emissive amine catalyst B[7] | 0.1 | 0.1 | 0.1 | 0.1 | 0.1 | 0.1 |
| Dodecyl benzene sulfonic acid | 0 | 0 | 0.01 | 0.05 | 0 | 0 |
| Dibutyltin diacetylacetonate | 0 | 0 | 0 | 0 | 0.01 | 0.05 |
| Polyisocyanate A[8] | 46.7 (100 index) | 48.9 (97 index) | 48.9 (100 index) | 48.9 (100 index) | 48.9 (100 index) | 48.9 (100 index) |

[1] A 6000 molecular weight, nominally trifunctional random copolymer of propylene oxide and ethylene oxide, with 14.5% ethylene oxide end-capping.
[2] A 5000 molecular weight, nominally trifunctional random copolymer of 22% by weight propylene oxide and 785 by weight ethylene oxide.
[3] A reaction product of methyldimethoxysilane and a 900 molecular weight poly(propylene glycol) monoallyl ether.
[4] A 900 molecular weight poly(propylene glycol) monoallyl ether.
[5] TB8715LF, from Evonik.
[6] Dimethylaminopropyl urea, marketed by Air Products as Dabco NE1070.
[7] 2-(2-dimethylaminoethoxy)ethanol.
[8] A mixture of 61% monomeric MDI and 39% polymeric MDI. 22% of the monomeric MDI is the 2,4'-isomer.

The foams are preconditioned for physical property testing by heating at 90° C. in mechanically circulated air for 24 hours. Foam properties are then measured as follows: 50% Compression set is measured according to ISO 1856. Foam density is measured according to ASTM D3574 Test A. Tear strength is measured according to DIN53356. Tensile strength and elongation to break are measured according to ISO 1798. Compression force depression (at 40% compression) is measured according to a propriety method based on ASTM D3574 Test C. Hysteresis loss is measured according to a proprietary method, in which the sample is compressed to 60% of its original thickness (40% compression). Results of this testing are as reported in Table 2.

TABLE 2

| Property | Comp. Samp. A | Comp. Samp. B | Ex. 1 | Ex. 2 | Ex. 3 | Ex. 4 |
|---|---|---|---|---|---|---|
| 50% Compression set, % | 3.4 | 4.2 | 4.0 | 3.8 | 5.9 | 5.5 |
| Density, kg/m$^3$ | 61 | 62 | 64 | 66 | 67 | 64 |
| Tear Strength, N/m (Average) | 207 | 190 | 216 | 235 | 219 | 246 |
| Tear Strength, N/m (Max) | 217 | 215 | 239 | 255 | 242 | 279 |
| Tensile Strength, kPa | 108 | 111 | 135 | 147 | 136 | 154 |
| Elongation to break, % | 67 | 76 | 72 | 75 | 78 | 76 |
| Compression Force Deflection 40%, kPa | 6.6 | 5.2 | 6.4 | 6.9 | 5.3 | 6.6 |
| Hysteresis loss, % | 14 | 16 | 15 | 15 | 14 | 15 |

Comparative Sample A represents a baseline experiment. No hydrolysable silane is present in the Comparative Sample A formulation. In Examples 1-4, 10 parts of Polyol A are replaced with an equal weight of a monol that has a terminal hydrolysable silane group, to produce a foam having a constant soft segment content. An additional 0.2 parts of water are provided in each of Examples 1-4 to react with the hydrolysable silane groups. In addition, a catalyst for the reaction of the hydrolysable silane group with water and/or a silanol is provided in each of Examples 1-4.

In Comparative Sample B, 10 parts of Polyol A are replaced with a polyether monol. This polyether monol does not contain hydrolysable silane groups, or other groups that can engage in secondary crosslinking reactions under the curing conditions.

By first comparing the results for Comparative Samples A and B, the effect of adding a monofunctional reactant into the foam formulation is seen. Tensile strength is essentially unchanged when adjusted for foam density, whereas elongation increases and tear strength is significantly reduced. The changes in tear strength and elongation are expected due to the decreased crosslink density and/or an increased number of defects in the polymer chain that are produced when monofunctional reactants are introduced into the foam formulation. The loss in compression force deflection from Comparative Sample A to Comparative Sample B is also indicative of reduced crosslink density and/or increasing numbers of defects in the polymer chain due to the inclusion of the monol in the formulation.

In Examples 1 and 3, tensile strengths are higher than for Comparative Sample A, even when adjusted for foam density, and elongations are higher, too. Tear strength is approximately equivalent when adjusted for foam density. All of these values are significantly higher than those of Comparative Sample B. These results indicate that secondary crosslinking has taken place in the Example 1 and Example 3 foams. Even though the hydrolysable silane compound reacts only monofunctionally with isocyanates, the physical property results do not indicate that crosslink density is reduced and/or defects in the polymer chain have increased relative to Comparative Sample A (as is the case with Comparative Sample B). This suggests that at least some of the hydrolysable silane groups have formed crosslinks.

Examples 2 and 4 exhibit markedly increased tear and tensile strengths compared with Comparative Sample A, even after adjusting those values for foam density. Elongation is increased at the same time, while hysteresis loss and compression force deflection are essentially unchanged. These results indicate that a greater amount of secondary crosslinking has occurred in these foams, presumably because due to the effect of using a greater amount of catalyst for the hydrolysable silane crosslinking reactions.

The viscosity of the formulated isocyanate-reactive mixture used to produce Comparative Example A is 1278 cPs. That of the isocyanate-reactive mixture used to produce Example 2 is only 1002 cPs, a reduction of 21% due to the inclusion of the hydrolysable silane compound. This reduction of viscosity is achieved without loss of properties; in fact, compression set, load-bearing, tensile strength, elongation and tear strength are all improved.

EXAMPLES 5-6 AND COMPARATIVE SAMPLE C

Polyurethane foams are made from the ingredients listed in Table 3 below. In each case, all ingredients except the polyisocyanate are mixed together to form a formulated isocyanate-reactive mixture. The formulated isocyanate-reactive mixture and the polyisocyanate are processed on a Canon A 60 HP high pressure machine equipped with an 18 mm diameter mixing head, and dispensed in aluminum molds. Component temperatures are 25° C. The mold temperature is 45-55° C. Demold time is 5 minutes.

TABLE 3

| | Parts by Weight | | |
|---|---|---|---|
| Ingredient | Comp. Samp. C | 5 | 6 |
| Polyol A[1] | 92.7 | 82.15 | 82.15 |
| Cell opener[2] | 3.0 | 3.0 | 3.0 |
| Hydrolysable Compound A[3] | 0 | 10 | 10 |
| Diethanol amine | 0.5 | 0.5 | 0.5 |
| Water | 2.5 | 3.0 | 3.0 |
| Silicone surfactant[4] | 0.45 | 0.45 | 0.45 |
| Low emissive amine catalyst A[5] | 0.1 | 0.1 | 0.1 |
| Low emissive amine catalyst B[6] | 0.75 | 0.75 | 0.75 |
| Dodecyl benzene sulfonic acid | 0 | 0.05 | 0.1 |
| Polyisocyanate A[7] | 85 index | 85 index | 85 index |

[1-3]See notes 1-3, Table 1.
[4-7]See notes 5-8, Table 1.

Test specimens from each of Comparative Sample C and Examples 5 and 6 are preconditioned by heating at 90° C. in mechanically circulated air for 24 hours. Foam density, hysteresis loss, resiliency, compression set, 40% compression force deflection (CFD) and TTE properties are measured as for the previous examples. Humid aged specimens from each of Comparative Sample C and Examples 5 and 6 are preconditioned in the same way, and then humid aged for 200 hours at 90° C. and 100% relative humidity. The humid aged specimens are then reconditioned by heating for 24 hours at 70° C. in mechanically circulated air. Compression force deflection, tensile strength and elongation are measured on the reconditioned samples as before. Results of this testing are as reported in Table 4.

TABLE 4

| Property | Comp. Samp. C | Ex. 5 | Ex. 6 |
|---|---|---|---|
| Density, kg/m$^3$ | 63 | 62 | 62 |
| Hysteresis loss, % | 15.0 | 17.1 | 15.2 |
| Resiliency, % | 66 | 62 | 62 |
| 50% Compression set, % | 2.5 | 1.7 | 1.2 |
| 40% CFD, kPa | 6.7 | 5.8 | 5.8 |
| Humid aged 40% CFD | 3.5 | 3.8 | 3.7 |
| % Change in 40% CFD after humid aging | −48 | −35 | −37 |
| Tear strength, N/m (Max.) | 160 | 190 | 200 |
| Tensile strength, kPa | 67 | 89 | 110 |
| Humid aged Tensile Strength, kPa | 59 | 80 | 84 |
| % Change in Tensile Strength after humid aging | −11.9 | −10.1 | −24 |
| Elongation to break, % | 55 | 66 | 73 |
| Humid aged elongation to break, % | 56 | 87 | 89 |
| % Change in elongation after humid aging | +1.80 | +31.8 | +21.9 |
| Humid Age Compression set, % | 7.8 | 10.2 | 9.7 |

As seen from the data in Table 4, foams of comparable density, hysteresis loss and resiliency are produced in all cases. Compression sets are significantly lower with the inventive foams. 40% CFD values after humid aging are equal or higher in Examples 5 and 6 than with Comparative Sample C; Example 5 has significantly higher CFD values both before and after humid aging. The loss in CFD after humid aging is thought to be due in part to the low emissive catalysts used in these runs. In Examples 5 and 6, the loss is smaller due to the presence of the hydrolysable silane compound; it is believed that the ability of the hydrolysable silane groups to form secondary crosslinks under humid conditions partially compensates for the effects of the low emissive catalysts. Tear strengths for Examples 5 and 6 are much larger than the control. Tensile strengths for the inventive foams after humid aging are very significantly higher for Examples 5 and 6. Elongations are higher for Examples 5 and 6, and are seen to improve upon humid aging.

EXAMPLE 7 AND COMPARATIVE SAMPLE D

A polymeric MDI having an isocyanate equivalent weight of 131.5 and an isocyanate functionality of 2.3 isocyanate groups/molecule is reacted with Hydrolysable Compound A at a weight ratio of 54.35:11 to produce an isocyanate-terminated quasi-prepolymer having an isocyanate equivalent weight of 158.1. In Examples 7A, 7B and 7C, this quasi-prepolymer is used as the polyisocyanate component of a polyurethane foam formulation, varying the isocyanate index from 90 (7A) to 100 (7B) and then to 110 (7C). Foams are prepared by mixing the components of the foam formulation, pouring the mixture in to an open container and allowing them to cure and rise freely. The foam formulation is set forth in Table 5 below.

Comparatives Samples D1, D2 and D3 are made in the same manner, except the polymeric MDI is used as the isocyanate component, without reaction with the hydrolysable silane compound.

Density (ASTM D3574 Test A), resiliency (ASTM D3574 Test H), tear strength (ASTM D3574 Test F), tensile strength and elongation (ASTM D3574 Test E) and compression force deflection (ISO 3386) are measured as before, with results as indicated in Table 5.

TABLE 5

| | Parts by Weight | | | | | |
|---|---|---|---|---|---|---|
| | D1* | 7A | D2* | 7B | D3 | 7C |
| Ingredient | | | | | | |
| Polyol A$^1$ | 94.0 | 94.0 | 94.0 | 94.0 | 94.0 | 94.0 |
| Cell Opener$^2$ | 6.0 | 6.0 | 6.0 | 6.0 | 6.0 | 6.0 |
| Diethanol amine$^3$ | 1.76 | 1.76 | 1.76 | 1.76 | 1.76 | 1.76 |
| Water | 3.04 | 3.04 | 3.04 | 3.04 | 3.04 | 3.04 |
| Silicone Surfactant$^4$ | 0.3 | 0.3 | 0.3 | 0.3 | 0.3 | 0.3 |
| Triethylene diamine$^5$ | 0.15 | 0.15 | 0.15 | 0.15 | 0.15 | 0.15 |
| DAAE$^6$ | 0.10 | 0.10 | 0.10 | 0.10 | 0.10 | 0.10 |
| Dibutyltindilaurate | 0.05 | 0.05 | 0.05 | 0.05 | 0.05 | 0.05 |
| Quasi-prepolymer | 0 | 65.36 | 0 | 72.62 | 0 | 79.88 |
| Polymeric MDI | 54.35 | 0 | 60.39 | 0 | 66.43 | 0 |
| Isocyanate index | 90 | 90 | 100 | 100 | 110 | 110 |
| Foam Properties | | | | | | |
| Density, kg/m$^3$ | 38 | 40 | 36 | 40 | 35 | 39 |
| Resiliency, % | 58 | 58 | 56 | 56 | 51 | 48 |
| Tear Strength, N/m | 98 | 132 | 116 | 148 | 138 | 156 |
| Tensile Strength, kPa | 38 | 42 | 40 | 53 | 61 | 76 |
| Elongation, % | 49 | 47 | 43 | 54 | 50 | 60 |
| 40% CFD, % | 2.6 | 2.6 | 3.0 | 3.2 | 3.7 | 4.3 |

*Not an example of the invention.
$^{1\text{-}2}$See notes 1-2 in Table 1.
$^3$85% solution.
$^4$Tegostab B8681 from Evonik.
$^5$33% solution.
$^6$Bis(dimethylaminoethyl)ether, 70% solution.

The data in Table 5 shows that tear strength is uniformly increased with the invention, even after adjusting for density, especially at 90 and 100 index. Tensile strength also increases and elongation is either essentially equivalent (Ex. 7A vs. Comparative D1) or increases (Ex. 7B vs. Comparative D2 and Ex. 7C vs. Comparative D3). The results suggest that the secondary crosslinking of the hydrolysable silane groups occurs even when the hydrolysable silane groups are present on an isocyanate-terminated quasi-prepolymer.

What is claimed is:
1. A process for making a flexible polyurethane foam comprising curing in one or more steps ingredients that include:
   a) one or more isocyanate-reactive compounds that contain an average of at least 2 isocyanate-reactive groups per molecule, contain no hydrolysable silane groups and have an equivalent weight per isocyanate-reactive group of at least 200;
   b) from 1 to 100 parts by weight, per 100 parts by weight of component a), of a polyether monol or polyol having one hydrolysable silane group per molecule and a molecular weight of from 500 to 5000;
   c) a blowing agent that includes water; and
   d) at least one organic polyisocyanate compound,
      wherein 1) some or all of component a), component b) or both can be pre-reacted with the organic polyisocyanate compound(s) to form an isocyanate terminated prepolymer or quasi-prepolymer; and 2) the isocyanate index is from 70 to 150.

2. The process of claim 1 wherein component b) is a polyether monol.

3. The process of claim 1 wherein water is the sole blowing agent.

4. The process of claim 3 wherein the ingredients include from 2 to 3.5 parts by weight of water per 100 parts by weight of component a).

5. The process of claim 1 wherein the ingredients include from 5 to 100 parts by weight of component b) per 100 parts by weight component a).

6. The process of claim 1 wherein the ingredients include at least one catalyst for the reaction of water or an alcohol with an isocyanate group and at least one catalyst for the reaction of a hydrolysable silane group with water or a silanol.

7. The process of claim 6 wherein the ingredients include no more than 2 parts by weight of a crosslinker per 100 parts by weight of component a) and no more than 3 parts by weight of a chain extender per 100 parts by weight of component a).

8. A process for making a flexible polyurethane foam comprising curing ingredients that include:
   a) one or more isocyanate-reactive compounds that contain an average of at least 2 isocyanate-reactive groups per molecule, contain no hydrolysable silane groups and have an equivalent weight per isocyanate-reactive group of at least 200;
   b) from 1 to 100 parts by weight, per 100 parts by weight of component a), of a polyether monol or polyol having at least one hydrolysable silane group per molecule and a molecular weight of from 500 to 5000;
   c) a blowing agent that includes water; and
   d) at least one organic polyisocyanate compound, wherein all or a portion of component b) is pre-reacted with the polyisocyanate (component d)) in the absence of water, to form an isocyanate-terminated prepolymer or quasi-prepolymer, and the prepolymer or quasi-prepolymer is then further cured by reaction with a mixture of water and component a) or a mixture of water and component a) and (1) any remaining portion of b), (2) a crosslinker and/or chain extender, or both (1) and (2) at an isocyanate index of from 70 to 150 to produce the foam.

9. The process of claim 1, wherein the organic polyisocyanate is prereacted with a chain extender or crosslinker to form a prepolymer or quasi-prepolymer which is then reacted with components a) and b) in the presence of component c) to form the foam.

10. A process for making a flexible polyurethane foam comprising curing ingredients that include:
   a) one or more isocyanate-reactive compounds that contain an average of at least 2 isocyanate-reactive groups per molecule, contain no hydrolysable silane groups and have an equivalent weight per isocyanate-reactive group of at least 200;
   b) from 1 to 100 parts by weight, per 100 parts by weight of component a), of a polyether monol or polyol having at least one hydrolysable silane group per molecule and a molecular weight of from 500 to 5000;
   c) a blowing agent that includes water; and
   d) at least one organic polyisocyanate compound, wherein the ingredients are reacted in a one step reaction at an isocyanate index of from 70 to 150 to produce the foam.

11. A flexible polyurethane foam made in accordance with claim 1.

* * * * *